United States Patent [19]
Pettit

[11] Patent Number: 6,077,620
[45] Date of Patent: Jun. 20, 2000

[54] FUEL CELL SYSTEM WITH COMBUSTOR-HEATED REFORMER

[75] Inventor: William Henry Pettit, Rochester, N.Y.

[73] Assignee: General Motors Corporation, Detroit, Mich.

[21] Appl. No.: 08/980,087

[22] Filed: Nov. 26, 1997

[51] Int. Cl.[7] .................................................. H01M 8/02
[52] U.S. Cl. .............................. 429/26; 429/17; 429/18; 429/19; 429/20
[58] Field of Search ................... 429/17, 18, 19, 429/20, 26

[56] References Cited

U.S. PATENT DOCUMENTS

| | | | |
|---|---|---|---|
| 4,650,727 | 3/1987 | Vanderborgh et al. | 429/19 |
| 4,659,634 | 4/1987 | Struthers | 429/19 |
| 4,670,359 | 6/1987 | Beshty et al. | 429/17 |
| 4,678,723 | 7/1987 | Wertheim | 429/17 |
| 4,923,768 | 5/1990 | Kaneko et al. | 429/19 |
| 4,994,331 | 2/1991 | Cohen | 429/17 |
| 5,372,617 | 12/1994 | Kerrebrock et al. | 48/61 |
| 5,429,886 | 7/1995 | Struthers | 429/44 |
| 5,484,577 | 1/1996 | Buswell et al. | 422/211 |
| 5,518,828 | 5/1996 | Senetar | 429/26 |
| 5,554,453 | 9/1996 | Steinfeld et al. | 429/17 |
| 5,605,770 | 2/1997 | Andreoli et al. | 429/20 |

FOREIGN PATENT DOCUMENTS

| | | |
|---|---|---|
| 07291996A | 8/1996 | European Pat. Off. |
| 61-197402 | 9/1986 | Japan. |
| 62-17002 | 1/1987 | Japan. |
| S63-44931 | 2/1988 | Japan. |
| 63-144101 | 6/1988 | Japan. |
| 63-230501 | 9/1988 | Japan. |
| 63-248075 | 10/1988 | Japan. |
| 01059778 | 3/1989 | Japan. |
| 02119061 | 5/1990 | Japan. |
| 03129674 | 6/1991 | Japan. |
| 03218902 | 9/1991 | Japan. |
| H4-58464 | 2/1992 | Japan. |
| H8-88017 | 4/1996 | Japan. |

OTHER PUBLICATIONS

Szaniszlo, "The Advanced Low–Emissions Catalytic–Combustor Program: Phase I—Description and Status," ASME #79–GT–192, Mar. 5, 1979.

Krill et al, "Catalytic Combustion for System Applications," ASME #79–HT–54, Dec. 14, 1979.

Hall et al, "A Porous Media Burner for Reforming Methanol for Fuel Cell Powered Electric Vehicles," SAE Paper #950095, Mar. 2, 1995.

*Primary Examiner*—Maria Nuzzolillo
*Assistant Examiner*—Mark Ruthkosky
*Attorney, Agent, or Firm*—Lawrence B. Plant

[57] ABSTRACT

A fuel cell system including a fuel reformer heated by a catalytic combustor fired by anode effluent and/or fuel from a liquid fuel supply providing fuel for the fuel cell. The combustor includes a vaporizer section heated by the combustor exhaust gases for vaporizing the fuel before feeding it into the combustor. Cathode effluent is used as the principle oxidant for the combustor.

5 Claims, 4 Drawing Sheets

FUEL CELL SYSTEM WITH COMBUSTOR-HEATED REFORMER

The Government of the United States of America has rights in this invention pursuant to Agreement No. DE-AC02-90CH10435 awarded by the U.S. Department of Energy.

TECHNICAL FIELD

The present invention relates to a fuel cell system having a combustor for heating a fuel reformer.

BACKGROUND OF THE INVENTION $H_2$—$O_2$ (air) fuel cells are well known in the art and have been proposed as a power source for many applications. There are several different types of $H_2$—$O_2$ fuel cells including acid-type, alkaline-type, molten-carbonate-type and solid-oxide-type. So-called PEM (proton exchange membrane) fuel cells [a.k.a. SPE (solid polymer electrolyte) fuel cells] are of the acid-type, potentially have high power and low weight, and accordingly are desirable for mobile applications (e.g., electric vehicles). PEM fuel cells are well known in the art, and include a "membrane electrode assembly" (a.k.a. MEA) comprising a thin, proton transmissive, solid polymer membrane-electrolyte having an anode on one of its faces and a cathode on the opposite face. The MEA is sandwiched between a pair of electrically conductive elements which (1) serve as current collectors for the anode and cathode, and (2) contain appropriate channels and/or openings therein for distributing the fuel cell's gaseous reactants over the surfaces of the respective anode and cathode catalysts. A plurality of individual cells are commonly bundled together to form a PEM fuel cell stack.

In PEM fuel cells hydrogen is the anode reactant (i.e., fuel) and oxygen is the cathode reactant (i.e., oxidant). The oxygen can either be in a pure form (i.e., $O_2$), or air (i.e., $O_2$ admixed with $N_2$). The solid polymer electrolytes are typically made from ion exchange resins such as perfluoronated sulfonic acid. The anode/cathode typically comprise finely divided catalytic particles (often supported on carbon particles) admixed with proton conductive resin.

For vehicular applications, it is desirable to use a liquid fuel such as a low molecular weight alcohol (e.g., methanol or ethanol), or hydrocarbons (e.g., gasoline) as the fuel for the vehicle owing to the ease of onboard storage of liquid fuels and the existence of a nationwide infrastructure for supplying liquid fuels. However, such fuels must be dissociated to release the hydrogen content thereof for fueling the fuel cell. The dissociation reaction is accomplished heterogeneously within a chemical fuel processor, known as a reformer, that provides thermal energy throughout a catalyst mass and yields a reformate gas comprising primarily hydrogen and carbon dioxide. For example, in the steam methanol reformation process, methanol and water (as steam) are ideally reacted to generate hydrogen and carbon dioxide according to the reaction:

$$CH_3OH + H_2O \rightarrow CO_2 + 2H_2$$

The reforming reaction is an endothermic reaction that requires external heat for the reaction to occur. The heat required to produce enough hydrogen varies with the demand put on the fuel cell system at any given point in time. Accordingly, the heating means for the reformer must be capable of operating over a wide range heat outputs. Heating the reformers with heat generated externally from either a flame combustor or a catalytic combustor is known. The present invention relates to an improved catalytic combustor, and the integration thereof with a fuel cell system so as to fuel the combustor with unreformed liquid fuel, hydrogen-containing anode exhaust gas, or both at different times in its operating cycle depending on the electrical demand placed on the system.

SUMMARY OF THE INVENTION

The present invention contemplates a fuel cell system comprising (1) a stack of $H_2$—$O_2$ fuel cells that exhaust some unused $H_2$ from the anode (anode effluent) and unused $O_2$ from the cathode (cathode effluent), (2) a fuel reformer for converting a hydrogen-containing liquid fuel (e.g. alcohol or hydrocarbon) into $H_2$ for fueling the fuel cells, and (3) a multi-fuel fired combustor for heating the reformer. The combustor is fueled by either or both the liquid fuel and the unused $H_2$ in the anode effluent and comprises (1) a housing having an input end that receives the fuel and the anode effluent, (2) an exhaust end that emits hot combustor exhaust gases to a heat exchanger associated with the reformer, and (3) a catalyst bed intermediate the input and exhaust ends of the combustor for burning the fuel and anode effluent to generate hot combustor exhaust gas. The combustor includes (1) a heat exchanger at the exhaust end exposed to the hot exhaust gas for vaporizing the liquid fuel, and (2) a conduit for conveying the vaporized fuel to the input end of the combustor during normal operation of the system following startup. Another conduit communicates the fuel cell stack with the input end of the combustor to convey the anode effluent from the fuel cell to the input end of the combustor. According to a preferred embodiment of the invention, there is provided still another conduit communicating $O_2$-containing cathode effluent from the fuel cell stack to the input end of the combustor to convey unused $O_2$ from the stack to the input end of the combustor. Preferably, the fuel vaporizing heat exchanger will comprise a coiled tube nested in the housing at the exhaust end of the combustor. Most preferably, the combustor will also include an electrical heater upstream of the catalyst bed for vaporizing liquid fuel supplied to the combustor during startup, and before vaporized fuel is produced by the heat exchanger at the exhaust end of the combustor. The heater may be either catalyzed or uncatalyzed.

The present invention will be better understood when considered in the light of the following detailed description of a preferred embodiment thereof which is given hereafter in conjunction with the several drawings in which:

DESCRIPTION OF THE PREFERRED EMBODIMENT

The invention is hereafter described in the context of a fuel cell fueled by reformed methanol (MeOH). However, it is to be understood that the principles embodied herein are equally applicable to fuel cells fueled by other endothermically reformable fuels such as ethanol or gasoline.

Figure 1:
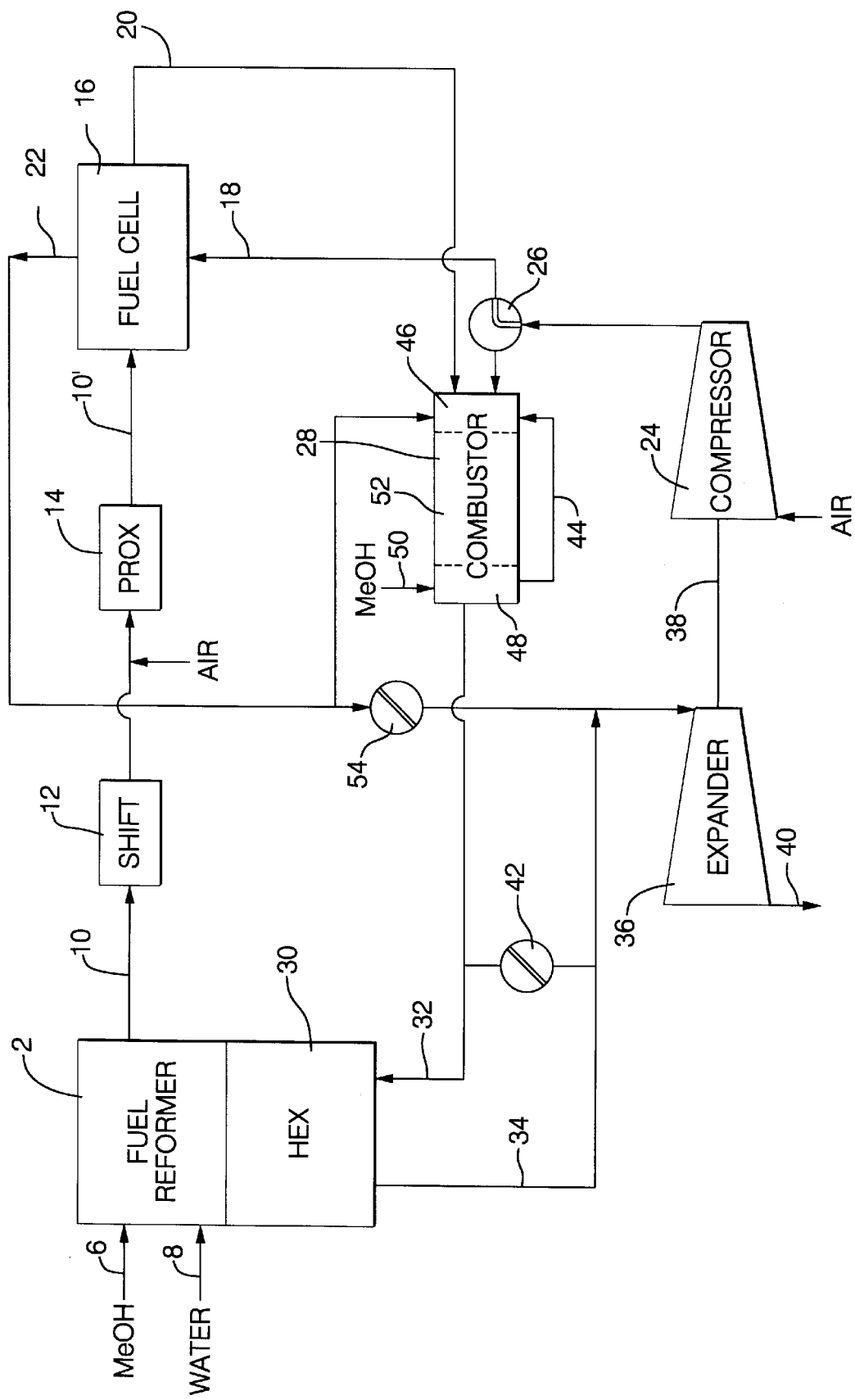
FIG. 1 is a schematic of a fuel cell system in accordance with the present invention.

FIG. 1 is a schematic of a fuel cell system including a reformer 2 for catalytically reacting methanol from methanol stream 6 and water from water stream 8 to form a hydrogen-rich reformate gas stream 10. The reformate output gas stream 10 comprises primarily $H_2$ and $CO_2$, but also includes $N_2$, CO and water. The reformate stream 10 passes through a shift reactor 12, and a preferential oxidation (PROX) reactor 14, as are well known in the art, to reduce the CO-levels therein to acceptable levels (i.e., below 20 ppm). The CO-purged reformate 10' is then fed into the anode chamber of fuel cell 16. At the same time, oxygen (e.g., air) from oxidant stream 18 is fed into the cathode chamber of the fuel cell 16. The hydrogen from the reformate stream 10 and the oxygen from the oxidant stream 18 react in the fuel cell 16 to produce electricity. Exhaust or effluent 20 from the anode side of the fuel cell contains some unreacted hydrogen. The exhaust or effluent 22 from the cathode side of the fuel cell contains some unreacted oxygen. Air for the oxidant stream 18 is provided by a compressor 24 and is directed to the fuel cell by a valve 26 under normal operating conditions. During startup, however, the valve 26 is rotated to provide air to the input of a combustor 28 used to heat the reformer 2, as will be described in more detail hereinafter.

The reformer 2 is associated with a heat exchanger 30 such that heat from the heat exchanger 30 heats the catalyst bed in the reformer 2. In this regard, the $H_2O$—MeOH mixture inputted to the reformer will be vaporized and preferably be recirculated/refluxed several times (e.g., 20×) through both the catalyst bed in the reformer 2 and the heat exchanger 30 such that the mixture also functions as a heat transfer medium for carrying heat from the exchanger 30 into the catalyst bed of the reformer 2. The heat exchanger 30 itself is heated from exhaust gases 32 exiting a catalytic combustor 28. The gases 34 exiting the heat exchanger 30 are still hot and pass through an expander 36 which is used to drive a compressor 24 via a drive shaft 38 before being dumped to the atmosphere 40. A shunt valve 42 permits bypassing the heat exchanger 30 and dumping the combustion gases 32 to the expander 36 when the reformer 2 does not require as much heat.

During normal operation (i.e., after the system has started up and is running), the combustor 28 is fueled by methanol vapor 44, or anode effluent 20 or both, each fed into an input end 46 of the combustor 28. The MeOH vapor 44 emanates from a vaporizer nested in the exhaust end 48 of the combustor 26. The vaporizer is a heat exchanger that extracts heat from the combustor exhaust to vaporize liquid MeOH 50 provided to the heat exchanger from the vehicle's fuel tank. The MeOH vapor 44 exiting the vaporizer and the anode effluent 22 are reacted in a catalyst section 52 of the combustor 28 lying intermediate the input and exhaust ends 46 and 48 respectively of the combustor 28. Oxygen is provided to the combustor either from the cathode effluent stream 22 or a compressor 24 (i.e., via valve 26) depending on system operating conditions. A valve 54 permits dumping the cathode effluent 22 to the atmosphere 40 via expander 36 when it is not needed in the combustor 28.

Figure 2:
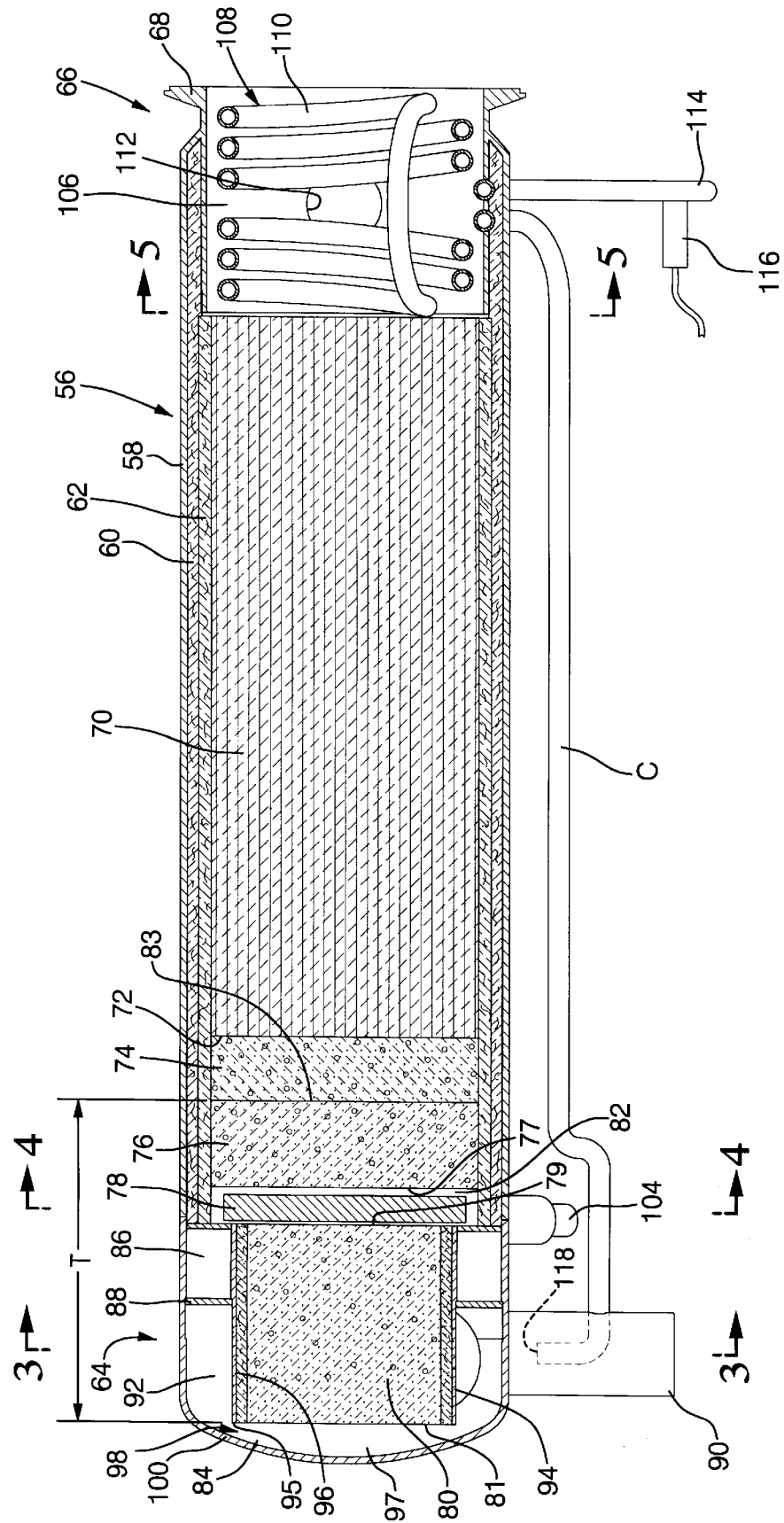
FIG. 2 is a sectioned side view of a combustor in accordance with the present invention.
Figure 3:
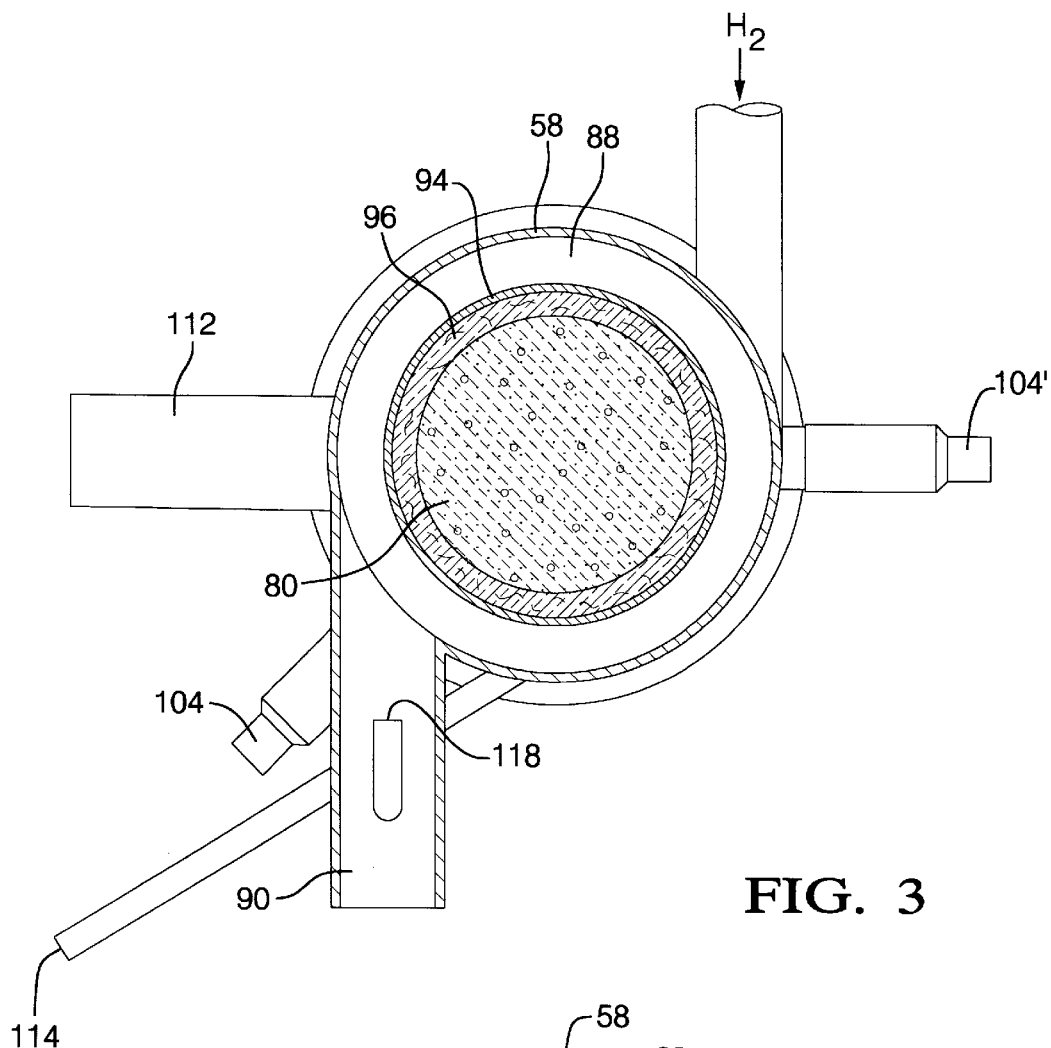
FIG. 3 is a view in the direction 3—3 of FIG. 2.

FIG. 2 is a side sectional view of a preferred combustor 56, in accordance with the present invention. The combustor 56 comprises a cylindrical metal housing 58 which is lined with two layers of insulating material 60 and 62. A preferred insulating material 60 comprises 0.180 inch thick layers of a ceramic material provided by the 3M company under the tradename INTERAM Mat Material. The combustor 56 has an input end 64 for receiving the combustor fuels and oxidants and an exhaust end 66 through which hot combustor exhaust gas is discharged from the combustor 56 into the heat exchanger 30 associated with the reformer 2 of FIG. 1. The exhaust end 66 includes a flange 68 for mounting to the input of the heat exchanger 30 of FIG. 1. A primary catalyst bed 70 is positioned between the input end 64 and exhaust end 66 for burning the fuel-oxidant reactants and preferably comprises a catalyst-coated extruded ceramic monolith type bed having about 400 cells per inch at the inlet face 72. Such beds are commonly used in automobile catalytic converters. The bed 70 could be broken into two or more sections/stages each separated from the next and each with a different porosity profile if so desired. A preferred catalyst comprises platinum, but other precious metals, or combinations thereof, may also be used depending on the performance requirements for the combustor. A catalyzed ceramic light-off foam 74 having a porosity profile of about 10 pores per inch and a thickness of about 0.79 inch is provided at the leading face 72 of the monolithic catalyst bed 70. The light-off foam 74 may comprise platinum on a silicon carbide foam substrate, and serves to light-off the reactants prior to their entering the catalyst bed 70, and also provides a tortuous path for mixing the reactants and promoting turbulent oxidation reactions.

A turbulator section T precedes the light-off foam 74 and comprises at least one porous bed of mixing media upstream of the light-off catalyst 74 which provides a tortuous path therethrough to promote turbulent flow, and intimate mixing of the combustor fuel(s) and air before they contact the light-off catalyst 74. The turbulator section T will preferably comprise at least two mixing-media beds 76 and 80 with an open chamber 82 between the mixing-media beds to act as a homogenization region for homogenizing the mixture exiting the first mixing-media bed 80 before it enters the second mixing-media bed 76. The mixing-media beds 76 and 80 have leading faces 77 and 81 respectively where the reactants enter the beds and trailing faces 79 and 83 respectively where the reactants exit the beds 76 and 80. Preferred mixing media comprises ceramic foams having a porosity profile of about 25 pores per lineal inch to about 80 pores per lineal inch, but other materials and porosity profiles may be used. A preferred mixing-media for bed 76 comprises silicon carbide foam having a porosity profile of about 25 pores per linear inch and a thickness of about one inch. Alternative mixing-media beds include refractory metal foams, ceramic pellets retained in a flow-through container, or a stack of fine (e.g., about 0.001 to about 0.010 openings per inch) metal or ceramic screens, wherein the openings of one screen are offset from the openings in adjacent screens to provide the desired tortuous path. The mixing-media bed 76 can also function as a flame suppressor to prevent any flame created at the light-off catalyst 74 from propagating back into the input end 64 of the combustor 56, and as a means to distribute the reaction mixture evenly across the leading face 72 of the catalyst bed 70.

Figure 4:
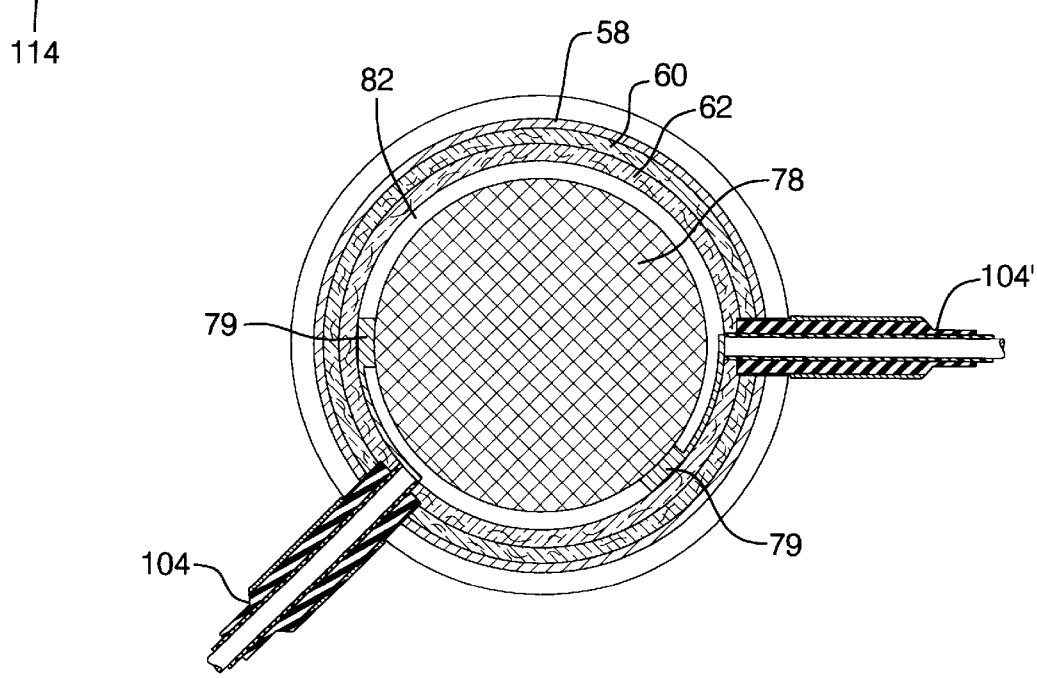
FIG. 4 is a view in the direction 4—4 of FIG. 2.
Figure 5:
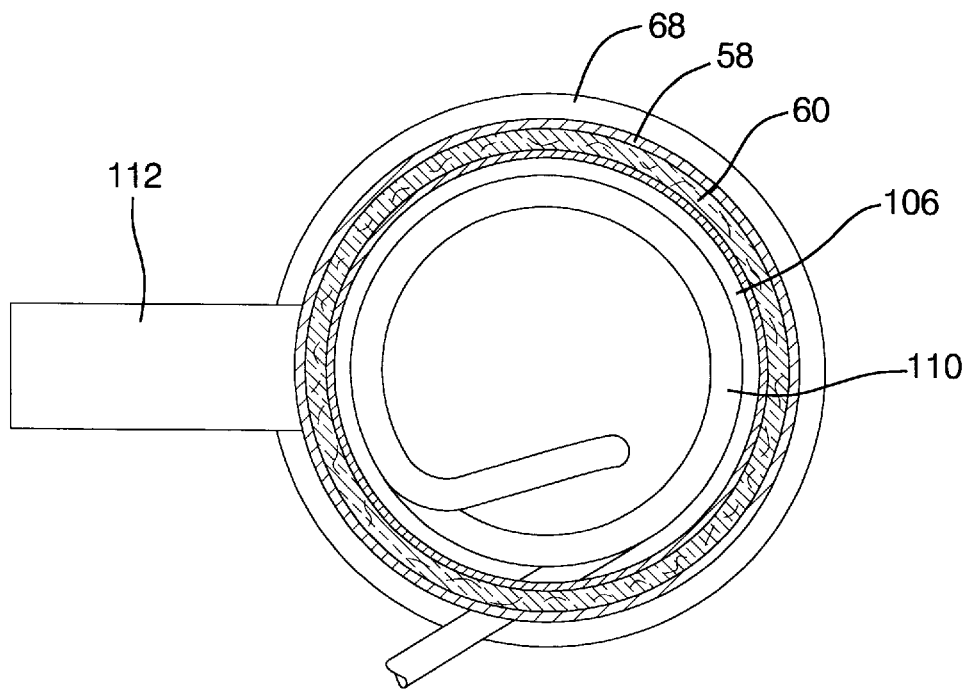
FIG. 5 is a view in the direction 5—5 of FIG. 2.

An electric heating element 78 is provided upstream of the mixing media 76 and serves to vaporize liquid fuel entering the combustor 56, and to heat the gas entering the catalyst bed 70 during initial startup of the combustor 56. The heating element 78 may or may not be catalyzed, and is energized by electrical contacts 79 and 79' (FIG. 4) which are provided with electricity via electrical leads 104 and 104'. After startup, the electric heater 78 is no longer required since the fuel will be vaporized by the exhaust gases emanating from the exhaust end 66 of the combustor 56, as will be discussed in more detail hereinafter. A preferred electric heater 78 comprises a commercially available, uncatalyzed extruded metal monolith resistance element such as is used to light off the catalyst of a catalytic converter used to treat IC engine exhaust gases.

Another mixing-media bed 80 of the turbulator section T lies upstream of the electric heater 78. The mixing-media 80 provides a tortuous path therethrough and induces turbulent flow for mixing the reactants before they contact the electric heater 78. The heater 78 resides in the homogenization space 82 that lies between the mixing-media beds 76 and 80 and further serves to promote mixing of the reactants exiting the first stage mixing media 80 prior to their entering the second stage mixing media 76. This first stage mixing media preferably has a smaller pore size than the second stage mixing media 76. A suitable turbulator first stage mixing media 80 comprises a ceramic foam comprising ytria-zirconia-alumina having a porosity profile of about 80 pores per linear inch and a thickness of about 0.375 inch. The mixing media 80 additionally serves as a flame arrestor to suppress any flame that might result from fuel ignited by the electric heating element 78, or down stream catalyst bed, from propagating back into the mixing chamber 84 where the reactants mix before passing through the mixing media 80.

$H_2$-containing anode effluent 20 (see FIG. 1) exiting the anode side of the fuel cell 16 enters the input end 64 of the combustor 56 via the annular plenum 86 that surrounds the shell 94 that contains the mixing media 80, and passes through a porous, metal disc 88 into the mixing chamber 92. The disc 88 may or may not be cooled (e.g., with water) and serves to diffuse the $H_2$ therethrough while functioning as a flame arrestor against flame entering into the plenum 86. The flame arrestor 88 will preferably comprise a sintered metal disk having a pore size of about 40 microns, and a thickness of about 0.078 inch. $O_2$-containing cathode effluent 22 (see FIG. 1) exiting the cathode side of the fuel cell 16 enters the input end 64 of the combustor 56, via conduit 90, and swirls in the annular chamber 92 defined centrally by the shell 94. In the chamber 92 the swirling cathode effluent picks up, and to some extent mixes with, the anode effluent passing through the flame arrestor 88. A suitable insulating material 96 similar to the insulating material 60 and 62 lines the shell 94 containing the mixing media 80. A narrow annular gap 98 (i.e., about 3.0 mm) between the leading edge 95 of the shell 94 and the end wall 100 of the housing 58 insures that some degree of mixing of the cathode and anode effluents occurs in the chamber 92 before they move into the input chamber 97, which is a vestibule to the mixing media 80.

Figure 6:
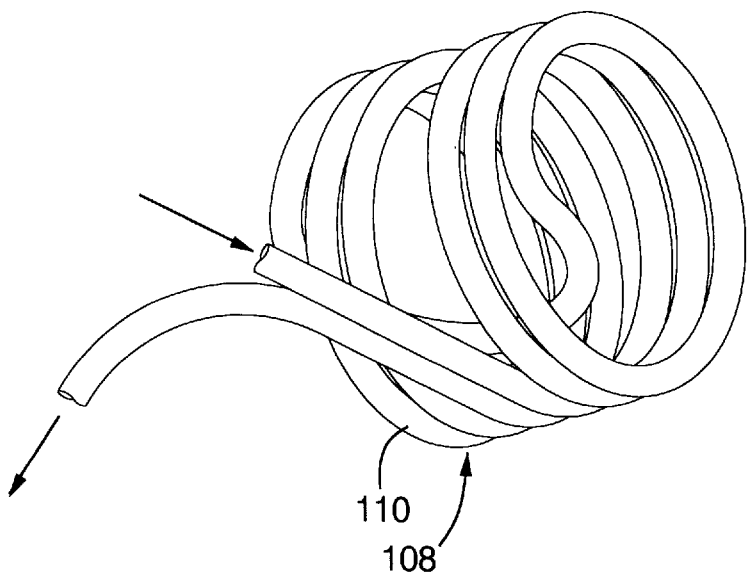
FIG. 6 is an isometric view of the heat exchanger of FIG. 2.

The exhaust end 66 of the combustor 56 includes a chamber 106 that houses a heat exchanger 108 which, in the embodiment shown, comprises a coil of metal tubing 110. (See FIG. 6). The heat exchanger 108 is used to vaporize liquid fuel used to fuel the combustor 56. More specifically, under normal post-startup conditions, air or cathode effluent 22 (see FIG. 1) may be introduced into the inlet end 114 of the coil 110 and mixed with liquid fuel sprayed into the input end 114 via a conventional automotive type fuel injector 116. The airborne atomized fuel passes through the several turns of the heated coil tube 110, and therein vaporizes and exits the heat exchanger 108 at outlet 118 which is located in the cathode effluent supply conduit 90. This vaporized fuel supplements the anode effluent 20 (see FIG. 1) as fuel for the combustor 56 as may be needed to meet the transient and steady state needs of the fuel cell system. The vaporizer coil 110 is sized to vaporize the maximum flow rate of fuel with the minimum combustor exhaust flow rate, and is designed to operate at temperatures exceeding the autoignition temperature of the MeOH-air mixture therein throughout its full operational range. Autoignition within the vaporizer is avoided, however, by insuring that the velocity of the mix flowing through the coil 110 significantly exceeds the worst-case flame speed of the mixture which varies with the composition of the inlet streams. For stoichiometric mixtures at atmospheric pressure, this speed would be 0.48 meters per sec. Hot combustion gases exiting the catalyst bed 70 contact the heat exchanger coil 110 for heating fluid flowing through the interior or the coiled tube 110. A pipe 112 coupled to the chamber 106 permits the diversion of any excess hot combustor exhaust gases from the chamber 106 which are not needed to heat the reformer. These diverted excess gases may conveniently be shunted to the expander 36 via valve 42 (see FIGS. 1).

The fuel cell system of the present invention operates as follows. At the beginning of operations when the system is cold and starting up: (1) the compressor 24 (FIG. 1) is driven by an electric motor energized from an external source (e.g., a battery) to provide the necessary system air; (2) air is introduced into conduit tube 90 as well as the input end 114 of the tubular heat exchanger 110; (3) liquid fuel (e.g., MeOH) is injected into the inlet end 114 of the tubular heat exchanger 110 via fuel injector 116, and admixed as fine droplets with the air flowing therein; (4) the air-MeOH droplet mix exits the now cold coil 110 at outlet 118 and mixes with compressor air introduced into conduit 90, and is then introduced into the annular chamber 92 in the input end 64 of the combustor 56; (5) the mix passes through the first mixing-media bed 80 of the turbulator section; (6) the mix exiting the mixing-media bed 80 is heated by the heater 78 in the homogenization chamber 82 to vaporize the liquid droplets and heat the mixture; (7) the preheated vaporous mix then enters the mixing-media bed 76 for still further intimate mixing before contacting the light-off catalyst bed 74; (8) upon exiting the mixing-media bed 74, the mix begins oxidizing on the light-off catalyst bed 74 just before it enters the primary catalyst bed 70, or reacting section of the combustor 56, where substantially complete combustion of the fuel is effected; and (9) the hot exhaust gases exiting the catalyst bed 70 are conveyed to the heat exchanger 30 associated with the reformer 2 (FIG. 1). Once the reformer's temperature has risen sufficiently to effect and maintain the reformation process: (1) valve 26 is rotated to direct air to the cathode side of the fuel cell 16 (FIG. 1); (2) MeOH and water are fed to the reformer 2 to commence the reformation reaction; (3) reformate exiting the reformer 2 is fed to the anode side of the fuel cell 16; (4) anode effluent 20 from the fuel cell 16 is directed into plenum 86 of the combustor 56; (5) cathode effluent 22 from the fuel cell 16 is directed into annular chamber 92 of the combustor 56; (6) air is introduced into the inlet 114 of the tubular heat exchanger 110; (7) liquid methanol is sprayed into the inlet 114 by the injector 116; (8) the methanol-air mix circulates through the heated tubular heat exchanger coil 110 where the MeOH vaporizes; (9) the Air-MeOH(V) mix exits the heat exchanger at outlet 118 and is fed into the chamber 92 along with the cathode effluent 22 where it mixes with the anode effluent passing through the flame arrestor 88 from plenum 86; and (10) the mix passes into the turbulator section of the combustor for burning on the catalyst bed 70 as discussed above in connection with the start-up mode. During normal (i.e., post startup) operating conditions, the heater 78 is not used as the heat exchanger coil 110 alone vaporizes the MeOH and preheats the MeOH-air mix. Under certain conditions, the combustor 56 could operate solely on the anode and cathode effluents alone, without the need for additional MeOH fuel from the heat exchanger 110. Under such conditions, MeOH injection through injector 116 is discontinued. Under other conditions, e.g., increasing power demands, supplemental fuel is provided to the combustor via the injector 116. More such supplemental fuel will be needed in the future as stack fuel efficiencies increase and the $H_2$ content of the anode effluent 20 and $O_2$ content of the cathode effluent 22 is reduced.

While the invention has been described primarily in terms of a specific embodiment thereof it is not intended to be limited thereto but rather only to the extent set forth hereafter in the claims which follow.

What is claimed is:

1. In a fuel cell system comprising (a) a stack of $H_2$—$O_2$ fuel cells discharging an $H_2$-containing anode effluent and an $O_2$-containing cathode effluent, (b) a reformer for converting a hydrogen-containing fuel selected from the group consisting of alcohols and hydrocarbons to $H_2$ for fueling said cells, (c) a first heat exchanger operatively associated with said reformer for heating said reformer, and (d) a combustor providing hot exhaust gas to said first heat exchanger for heating said reformer during the reformation process, the improvement comprising:

said combustor being fueled by said fuel and said anode effluent and comprising a housing having an input end adapted to receive said fuel and said anode effluent, an exhaust end emitting hot combustor exhaust gas to said first heat exchanger, and a catalyst bed intermediate said input and exhaust ends for burning said fuel and said anode effluent to generate said combustor exhaust gas;

a second heat exchanger in said exhaust end of said combustor and exposed to said hot exhaust gas for vaporizing said fuel when said combustor is operating under post-startup conditions, said second heat exchanger having an inlet for receiving said fuel as a liquid, and an outlet for discharging said fuel as a vapor;

a first conduit communicating said outlet with said input end of said combustor; and a second conduit communicating said stack with said input end of said combustor to convey said anode effluent to said combustor.

2. A system according to claim 1 including a third conduit communicating said stack with said input end of said combustor to convey said cathode effluent to said combustor.

3. A system according to claim 1 wherein said heat exchanger comprises a tubular coil.

4. In a fuel cell system comprising (a) a stack of $H_2$—$O_2$ fuel cells discharging an $H_2$-containing anode effluent and an $O_2$-containing cathode effluent, (b) a reformer for converting a hydrogen-containing fuel selected from the group consisting of alcohols and hydrocarbons to $H_2$ for fueling said cells, (c) a first heat exchanger operatively associated with said reformer for heating said reformer, and (d) a combustor providing hot exhaust gas to said first heat exchanger for heating said reformer during the reformation process, the improvement comprising:

said combustor being fueled by said fuel and said anode effluent and comprising a housing having an input end adapted to receive said fuel and anode effluent, an exhaust end, and a catalyst bed intermediate said input and exhaust ends for burning said fuel and said anode effluent to generate a hot combustor exhaust gas that exits said exhaust end;

a second heat exchanger in said exhaust end of said combustor and exposed to said hot exhaust gas for vaporizing said fuel when said combustor is operating under post-startup conditions, said second heat exchanger having an inlet for receiving said fuel as a liquid, and an outlet for discharging said fuel as a vapor;

a first conduit communicating said outlet of said second heat exchanger with said input end of said combustor;

a second conduit communicating said stack with said input end of said combustor to convey said anode effluent to said combustor; and an electrical heater in said input end upstream of said catalyst bed for vaporizing fuel supplied to said combustor during startup of said combustor.

5. A fuel cell system according to claim 4 wherein said heater is catalyzed.

* * * * *